Feb. 15, 1955 J. H. SEFREN ET AL 2,702,203
SEAL
Filed Oct. 8, 1948
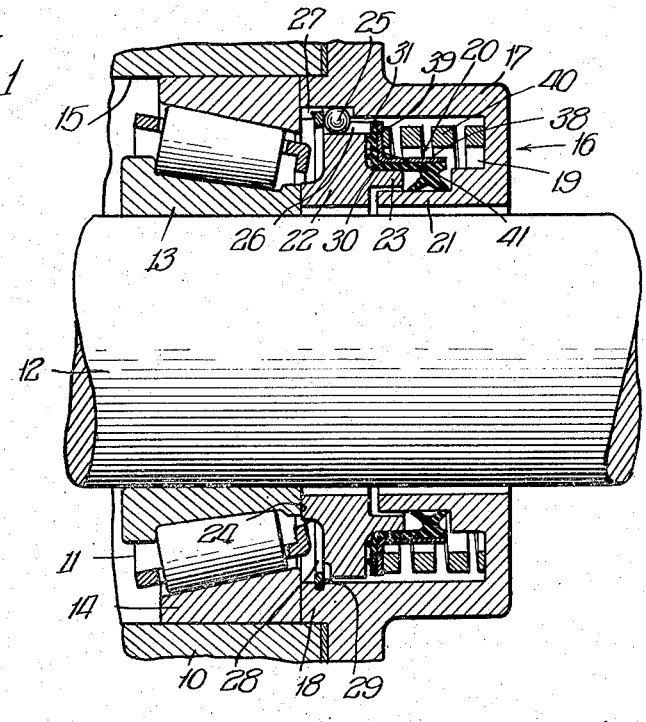
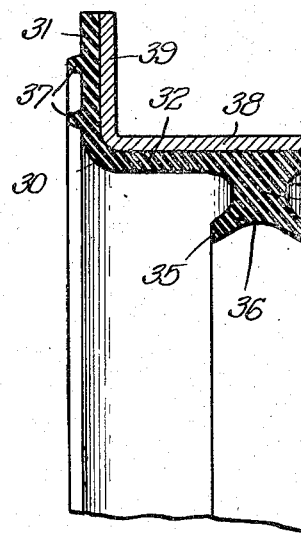
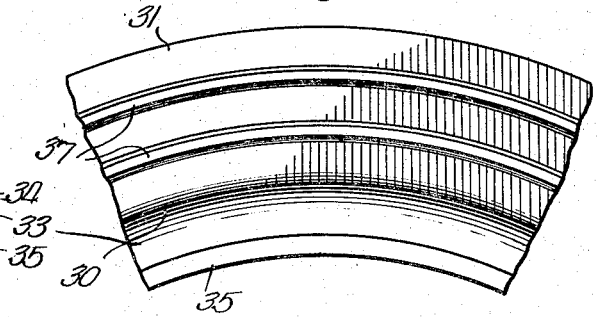
INVENTORS.
John H. Sefren,
BY John C. Erk.
Cromwell, Greist + Warden
Attys.

United States Patent Office 2,702,203
Patented Feb. 15, 1955

2,702,203
SEAL

John H. Sefren, Chicago, and John C. Eirk, Peoria, Ill., assignors to Chicago Rawhide Manufacturing Company, Chicago, Ill., a corporation of Illinois Application October 8, 1948, Serial No. 53,424

3 Claims. (Cl. 286—11)

This invention relates to an improved end face, oil or dust seal of the static type which is particularly devised for installation on tractors and like creeper mechanisms, for example, to seal the track roller shafts thereof. However, it will be apparent that the structure is also adapted for various other installations.

It is an object of the invention to provide a seal of the foregoing character which is very compact in size, which is simple and economical in its parts, which is readily installed, and which functions efficiently to seal a pair of relatively rotatable parts against entry of dirt or foreign matter, loss of lubricant, and the like.

Another object is to provide a sealing assembly including a rigid, annular nosepiece, a hollow chambered seal housing and a diaphragm type sealing unit disposed in said housing in a novel sealing relation to said nosepiece and housing, said sealing unit including a resilient, flexible member of L-shaped configuration and a rigid backing member bonded thereto to radially brace the same and to serve as a thrust receiving member for the unit.

Yet another object is to provide a reinforced sealing unit for use in association with a sealing assembly of the foregoing type, including a flexible diaphragm of L-shaped cross section, characterized by a radial end sealing element and an axially extending sleeve portion provided with a radial, dual-lip sealing element, said member being stiffened by a rigid stamping which is nested thereover and bonded thereto and said stamping also serving as a thrust receiving member engaged by a spring which is associated with the unit.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 1 is a fragmentary view in central, axial section illustrating the seal assembly of the invention in operative assembled relation to a pair of relatively rotatable parts which are sealed thereby;

Fig. 2 is an enlarged fragmentary view of the sealing unit of the assembly, being in section corresponding to that of Fig. 1; and Fig. 3 is a fragmentary end view of said sealing unit as viewed from the left of Fig. 2.

Referring to the drawings, the part 10 shown in Fig. 1 may be considered, for purpose of illustration, to be the hub of a track roller of a creeper type tractor or other like vehicle, which roller is rotatably mounted by the roller bearing 11 on a fixed shaft 12. Obviously, however, the seal structure is also adapted for application to numerous other relatively rotatable parts. In the installation shown, the inner bearing race 13 is secured to shaft 12 and the outer race 14 is fixedly mounted in the bore 15 of the roller 10. Inner race 13 is adapted to serve as a mating ring for the seal assembly of the present invention, which is generally designated by the reference numeral 16.

The assembly 16 comprises a one-piece hollow chambered housing 17 provided with an axially extending, annular marginal shoulder 18 which is preferably force fitted in the roller bore 15. Said housing has an internal chamber 19 receiving the sealing unit of the invention, generally designated 20, and other associated parts. This chamber is in part defined by the axially extending, annular, re-entrant bearing flange 21 disposed centrally of and in radially spaced relation to shaft 12.

A rigid nosepiece of face sealing ring 22 is telescoped axially in a housing 17 adjacent the left-hand side thereof, being provided with a rearwardly extending, annular lip 23 which surrounds the forward end of housing flange 21. Sealing ring 22 is disposed in radially spaced relation to the shaft and has an axially extending sealing nose 24. This nose effects a running seal with the above mentioned inner bearing race 13. Ring 22 is non-rotatively keyed to the seal housing 17 by means of a ball 25 located in peripheral slots 26, 27 of the sealing ring 22 and housing 17 respectively. The ball is held in place by a split snap ring 28 received in an annular internal groove 29 of the housing. The same snap ring restrains the sealing nosepiece 22 and associated parts against axial separation from housing 17, prior to the mounting of the seal in operative position.

The sealing unit 20 of the present assembly consists of a resilient, flexible diaphragm 30 of rubber, synthetic rubber, or like flexible material, molded in a generally L-shaped cross-sectional outline. It includes an annular, radially extending flange 31 and an axially extending sleeve portion 32 integral with said flange, said sleeve portion being provided adjacent its rear margin with a radially extending sealing element 33 of substantial thickness. Said sealing element flares in opposite axial directions from a medial, constricted waste portion 34 thereof to the opposed, flexible sealing lips 35. These lips are separated and internally defined by the arcuate inner periphery 36 of the sealing element 33. The radial flange 31 of the diaphragm 30 is provided with a pair of concentric, annular, axially extending ribs 37.

Diaphragm 30 thus presents an axially acting sealing portion or flange 31, a sealing element 33 which is spaced substantially to the rear thereof in the axial sense, providing relatively flexible, axially spaced sealing lips 35, and in integral, intervening sleeve length 32 connecting the same, this sleeve portion extending sufficiently rearwardly to clear the lips 35 with reference to the rear nose piece lip 23. Sleeve 32 thus acts as a connecting cantilever supported forwardly on the nosepiece.

The sealing unit 20 is completed by an angular stiffening member which is in the form of an L-shaped steel stamping 38 nested over the L-shaped diaphragm 30 in concentric relation thereto. The diaphragm is integrally bonded to this stamping, as by vulcanization, a suitable adhesive, or otherwise. It thus acts to reinforce and stiffen the diaphragm and maintain sealing action of its dual flexible lips 35 against the sleeve-like axial flange 21 of the housing. The radially extending portion 39 of the L-shaped stamping serves as a thrust surface against which the coil compression spring 40 bears, as illustrated in Fig. 1, whereby the annular sealing ribs 37 are thrust against the shaped angular or stepped rear surface of the sealing ring 22. They are held in fixed non-rotative engagement with this surface to prevent ingress of foreign matter or leakage of lubricant at this zone. The separate lips of the radial sealing element 33 similarly engage the re-entrant flange 21 of the housing, in non-rotative engagement therewith, to seal the assembly at this location. There are no moving parts in the seal, save for a possible slight axial sliding of the sealing element 33 on flange 31 during the operation of the seal. Radial misalignment of the roller and shaft is compensated by the flexing action of the lips 35 of said element, the stamping 38 substantially localizing the flexure of element 33 at said lips.

Flexible sealing lips 35 provide a desired degree of responsivity in sealing against the housing flange 21, and the rigid stamping 38 stabilizes the cantilever sleeve portion 32 of the diaphragm, thereby controlling excessive flexure of the latter in its intermediate zone.

We claim:
1. A seal comprising a support having an annular, axially extending sealing surface, a sealing ring provided with a forward sealing nose, the rear of said ring being shaped to provide a recessed sealing seat, a sealing unit comprising a resilient annular sealing member of substantially L-shaped cross section and a backing member of like section nested on and bonded to said sealing member, said unit being telescoped on said sealing ring seat, said sealing member having a radially extending portion in axial thrust engagement with said sealing seat and an axial portion extending rearwardly of said ring in telescoped relation to said axial sealing surface, said axial portion terminating in a radially inwardly extending sealing element, which element includes a plurality of axially spaced lips in sealing engagement with said sealing surface, and a spring axially abutting a radial portion of said backing member to urge said unit against said sealing seat.

2. A seal comprising a support having an annular, axially extending sealing surface, a sealing ring provided with a forward sealing nose, the rear of said ring being shaped to provide a recessed sealing seat, a sealing unit comprising a resilient annular sealing member of substantially L-shaped cross section and a backing member of like section nested on and bonded to said sealing member, said unit being telescoped on said sealing ring seat, said sealing member having a radially extending portion in thrust engagement with said sealing ring seat and an axial portion extending rearwardly of said ring in telescoped relation to said axial sealing surface, said axial portion being provided with a radially extending sealing element including a plurality of flexible, axially spaced sealing lips in sealing engagement with said sealing surface, and a spring axially abutting a radial portion of said backing member to urge said unit against said sealing ring seat.

3. A seal of the type described, comprising a sealing unit, said unit including a flexible annular diaphragm of generally L-shaped cross section provided with radially and axially extending sealing portions and a rigid annular backing member of generally L-shaped section nested on and bonded to said diaphragm with radial and axial portions thereof in bracing relation to said respective portions of said diaphragm, a rigid annular nosepiece abuttingly engaged by said sealing element, the rear of said nosepiece being shaped to provide an annular recessed seat which nestingly receives said unit, a hollow housing enclosing said unit, which housing is provided with an internal axial surface sealingly engaged by the axially extending portion of said diaphragm, and a spring acting axially between said housing and the radial portion of said backing member to urge the radially extending portion of said diaphragm against said nosepiece seat, said axially extending diaphragm sealing portion including a pair of spaced lips in flexible sealing engagement with said axial housing surface.

References Cited in the file of this patent

UNITED STATES PATENTS

| | | |
|---|---|---|
| 2,395,107 | Dodge | Feb. 19, 1946 |
| 2,403,298 | Payne | July 2, 1946 |
| 2,426,047 | Payne | Aug. 19, 1947 |
| 2,430,426 | Katcher | Nov. 4, 1947 |
| 2,432,694 | Snyder | Dec. 17, 1947 |
| 2,444,713 | Solari | July 6, 1948 |
| 2,462,280 | Payne | Feb. 22, 1949 |
| 2,474,123 | Schmitz | June 21, 1949 |

FOREIGN PATENTS

| | | |
|---|---|---|
| 874,472 | France | of 1942 |